(12) United States Patent
Chu

(10) Patent No.: US 6,366,587 B1
(45) Date of Patent: Apr. 2, 2002

(54) TDM BACKPLANE STREAM RESOURCE DISTRIBUTION SYSTEM

(75) Inventor: Paul Ruey Perng Chu, Saratoga, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/143,593

(22) Filed: Aug. 31, 1998

(51) Int. Cl.[7] .............................................. H04B 7/212
(52) U.S. Cl. ...................... 370/442; 370/400; 370/458
(58) Field of Search ................................ 370/442, 458, 370/463, 400, 401, 468; 375/222

(56) References Cited

U.S. PATENT DOCUMENTS

| 4,918,722 | A |   | 4/1990  | Duehren et al. |
| 5,291,546 | A |   | 3/1994  | Giler et al. |
| 5,369,686 | A |   | 11/1994 | Dutra et al. |
| 5,488,651 | A |   | 1/1996  | Giler et al. |
| 5,594,727 | A | * | 1/1997  | Kolbenson et al. ......... 370/442 |
| 5,594,732 | A |   | 1/1997  | Bell et al. |
| 5,659,542 | A |   | 8/1997  | Bell et al. |
| 5,712,907 | A |   | 1/1998  | Wegner et al. |
| 5,767,985 | A |   | 6/1998  | Yamamoto et al. |
| 5,805,298 | A |   | 9/1998  | Ho et al. |
| 5,812,278 | A |   | 9/1998  | Toyoda et al. |
| 5,838,683 | A |   | 11/1998 | Corley et al. |
| 5,838,915 | A |   | 11/1998 | Klausmeier et al. |
| 5,838,994 | A |   | 11/1998 | Valizadeh |
| 5,859,550 | A |   | 1/1999  | Brandt |
| 5,864,542 | A |   | 1/1999  | Gupta et al. |
| 5,867,666 | A |   | 2/1999  | Harvey |
| 5,912,888 | A | * | 6/1999  | Walsh et al. ................. 370/355 |

FOREIGN PATENT DOCUMENTS

WO   WO 97/18665   5/1997   ............ H04N/1/00

* cited by examiner

Primary Examiner—David R. Vincent
Assistant Examiner—Bob A. Phunkulh
(74) Attorney, Agent, or Firm—Maryam Imam

(57) ABSTRACT

A preferred embodiment of the present invention is disclosed to include a router system having a trunk feature card and at least one modem feature card for transferring communication information between the modem feature cards through a TDM backplane, to the trunk card, for transfer thereof to Digital Subscriber (DS) lines, the router and modem cards while co-existing within the same router system, having no knowledge of the characteristics of each other with many different combinations of such trunk and modem cards being employed by the router system. The router system accommodating "over-subscription" situations wherein the number of DS lines is less than the number of modems and initialization the system such as to maximize the utility of the DS lines as a function of the type of modem cards in the system.

13 Claims, 6 Drawing Sheets

| Modem Cards / Trunk Cards | Old Parador (20) | Old Microcom (24) | Old Amazon I (60) | New Amazon II (120) |
|---|---|---|---|---|
| Old DUAL (60) | | | NA | NA |
| Old QUAD (120) | NA | | | |
| New QUAD II (180) | NA | NA | | |
| New OCTAL (240) | NA | NA | | |

NA = Illegal Combination

*FIG. 4*

2 Amazon II (240 Modems)
+ 1 Quad (120 DS 0 lines)

TDM BACKPLANE STREAM RESOURCE DISTRIBUTION SYSTEM

BACKGROUND OF THE INVENTION

1. Field of the Invention

This invention relates generally to a network architecture providing improved utilization communication information between digital subscriber lines and communications devices, and more particularly to increasing performance of router systems for transferring digital communications information between various different types and numbers of modem through digital subscriber lines.

2. Description of the Prior Art

Routers are employed in the telecommunications area as sophisticated switches. That is, a router is a device that can select a path data should take thereby requiring the router to have an understanding of the network and how to determine the best route for the data path.

Servers are sophisticated storage devices that maintain information, such as web pages, for access by various other communications equipment such as PCs. Information between servers, PCs and the like, may be transferred through routers.

Information that is transferred by routers between various communications equipment is often times in the form of packets and coupled onto communication links (or lines) using Time Division Multiplexing (TDM). This is perhaps best understood by describing an example commonly employed by users.

When data such as electronic mail is transmitted over the internet, the data is diced up into small packages called packets, each packet having an address attached. The packets flow through the circuits of the internet, such as routers, servers and so forth, but they do not all necessarily follow exactly the same path. They do however, all arrive at the same destination, and are reassembled into the original data. The various packets belonging to the same original data are identified by the use of their attached address.

Devices that send data through routers do so at various times on various communications channels that serve as links for transferring the data from the devices, through the routers, and to the final device destination. The path from a device to a router includes such communications links or TDM streams. Data through such streams is transferred for each device when the link is not busy and given a time slot during which the data belonging to a particular device is coupled onto the link and transferred. A link may carry information from various devices to the router, accordingly, data from various devices are multiplexed.

With the advent of recent advancements in router technology, there has been an important requirement placed on routers. The requirement calls for the universal support of various 'feature' boards that have been developed recently to support a variety of modem and other communications devices. Feature boards are complex printed circuit boards that may serve various purposes. For example, a 'trunk' feature board within a router may serve to receive digital information from multiple TDM streams onto which the digital information is coupled. The trunk feature board may be electronically coupled, through a TDM backplane, to various 'modem' feature boards. These modem feature boards transfer information from the trunk feature card to many modems of various types. This is perhaps best described by the use of a diagram.

FIG. 1 depicts a router 10 coupled to a central office 12, which may be a telephone company switch, through a set of communication links 14 that may be of T1 or E1 industry standard form of communication line. T1 and E1 comply with standards set by the Institute of Electrical and Electronics Engineering (IEEE) for multiplexing various communication information from various sources (or devices) for transmission to other devices. The communication lines, individually, are commonly referred to as Digital Subscriber 0 (DS0).

Router 10 includes a trunk feature card 16 coupled through a TDM backplane 18 to a modem feature card 20. While not shown in FIG. 1, a router may include more than one modem feature card. The modem card 20 couples modem signals for transfer thereof to modem devices. Rather than modem signals and devices, Digital Signal Processing (DSP) signals and devices may be similarly employed.

The TDM backplane 18 transfers TDM streams and channels from the trunk card 16 to the modem card 20 by coupling the same onto a first plurality of TDM streams 22 (for coupling signals from the trunk card 16 to the backplane 18) and a second plurality of TDM streams 24 (for coupling signals from the backplane 18 to the modem card 20).

The trunk card 16 and the modem card 20 each include a first TDM chip 26 and a second TDM chip 28, respectively. These TDM chips are integrated circuits for arranging information, that is sent through the TDM communications link, into frames and vice versa. Each frame includes a predetermined number of channels and each channel carries information for a specific device that is using the router 10 for transferring information to another device. In a system that uses T1 communication links, there are 24 channels in a frame and in a system that uses E1 communication links, there are 30 channels in a frame.

Cisco Systems, Inc. designs, develops and manufactures various types of router products commonly employed in the industry for transferring internet information, arranged in packets, and for other types of telecommunications applications. One such router is referred to as the AS5200 and another is the AS5300 family of products.

Whereas the AS5200 supports 4 TDM streams carrying TDM information through a TDM backplane, the AS5300 supports 8 TDM streams. As described above, the modem feature cards(s) rely on the TDM backplane, which receives TDM streams, to communicate with external equipment through the trunk feature card.

One of the problems that arises with respect to prior art router systems, such as the one shown in FIG. 1, is that access to TDM streams is limited to four streams. While in routers supporting fewer number of modems (such as 60 modems), this was acceptable, a problem arises in recently-developed routers, which may support 240 or more modems. Each TDM stream can typically transfer 30 modem channels (using E1) and since previous router designs only had four TDM stream interfaces that were dedicated (not dynamically allocatable) lines, if trunk cards having more than 120 DS0 line interfaces were used, only 120 modem channels could be supported before having to share a channel by various modems. For example, if the modem feature cards supported 180 modems, due to the streams being limited in number to four, and with each stream carrying 30 channels, 60 of the modem channels would not be usable thereby introducing an over-subscription problem to the system. This is because TDM channels cannot be shared.

Dedicated TDM stream lines only allow for statically-allocated TDM time slots assigned based upon the order in which the feature boards in the router system are identified when the system is first powered-on. Moreover, each modem in the system only has one dedicated TDM backplane time slot. Once these backplane timeslots are allocated, the relationship between the time slots and the modems stays unchanged throughout the lifetime of the router until the next initialization of the system, after which this relationship again becomes fixed.

Another problem that arises with the advent of recently-developed router technology is the capability of using old trunk and modem feature boards in combination with more recently-designed trunk and modem feature boards such that the old boards and the new boards inter-operate with each other seamlessly.

The trunk feature cards may be considered 'Producers' of TDM backplane stream resources (or time slots) and the modem feature cards may be considered 'Consumers' of the TDM backplane stream resources in that they consume or utilize time slots for effecting communication of modem or telecommunications signals between modem devices and other devices.

When a router system includes a mixed combination ('old' and 'new' versions) of trunk and modem feature cards, the TDM resources that are produced by the trunk feature cards may not be accessible by the modem feature cards because new trunk feature cards may be in use with old modem feature cards that may not support additional TDM resources. Similarly, new modem feature cards, when in use with old trunk cards, may attempt to request resources that can not be produced by old trunk feature cards.

In prior art techniques, to resolve this problem and have all of the feature cards inter-operate with each other, the driver-level software program was designed to maintain knowledge of which feature cards are installed in the router system so that the resources produced (time slots allocated) may all be employed by the Consumer. However, the problem with this approach is that feature boards have their own physical limitation in that they have access to a set group of wiring without the capability to share these resources outside of what has been assigned to them. For example, a feature board may only have access to a first group of wiring without the capability of sharing any other groups of wiring, which would limit access by that feature board to a predetermined number of digital subscribers. Where, for example, more modems are in the system than the number of digital subscribers, some modems would not be utilized resulting in an under-utilization of the resources available in the system.

Yet another problem associated with prior art techniques is known as "over-subscription", which occurs when the number of modem devices (and therefore channels) exceeds the number of Digital Subscriber (DS0) channels that may be supported by a trunk card. This is because each type of modem card can support a predetermined number of modems, i.e. a modem card can support up to a predetermined number of (or less but not more) modems, and each type of trunk card similarly can only interface with a predetermined number of TDM streams.

With the static allocation of the backplane timeslots in an over-subscribed system, some of the modems would never be accessible since there is just not enough backplane timeslot resources for all of the modems to support either incoming or outgoing calls.

For example, what is referred to by Cisco Systems, Inc. as their 'Quad' type of trunk card can support 4 TDM streams, which provides T1 or E1 connections of up to 120 DS0s for use by either digital or analog circuits. In router systems of prior art technology, there can be no more than 120 modems that would exist in the same system utilizing the Quad trunk card. This would allow each modem to be connected to one DS0 causes, in total, up to 120 DS0-to-modem connections. However, with the introduction of new modem feature boards (such as Amazon II family of Cisco Systems products), the number of modems can go from 120 to 240 when there are two such modem feature boards installed in the router system. This creates an "over-subscription" problem due to the number of modems exceeding the number of available DS0S.

Therefore, the need arises in a router system to provide the capability of employing feature cards that can be installed in any order. A method is required for allowing flexible electrical coupling of various feature boards such that the software program employed by each of the feature boards (or cards) would allow producing or consuming of the TDM backplane stream resources without apriori knowledge of the characteristics of the TDM backplane as well as the various different feature boards that are installed in the router system.

Furthermore, with the need for providing universal support of old and new feature boards, there further arises the need for the router system to provide connectivity for all of the possible feature boards that can co-exist in the same router system.

What is further needed is a router system that allows inter-operability of various different combinations of modem cards and trunk cards, effectuating flexible and dynamic allocation of modems to TDM streams for maximizing the utilization of communication links to increase the overall performance of router systems. Additionally, the capacity of subscribers (using DS0lines) can be extended as new modem boards are upgraded.

Finally, a router system is needed to support the mixture of various types of feature boards for dynamically managing the backplane timeslots resources.

SUMMARY OF THE INVENTION

Briefly, a digital communications system for coupling a plurality of digital communication devices to a central office includes a backplane; a trunk card device coupled to Digital Subscriber (DS) channels and further coupled to a first trunk group of streams and a second trunk group of streams, the first and second trunk streams for transferring modem information to and from the DS channels through the backplane; and at least one modem card device, coupled through a first modem group of streams and a second modem group of streams to said backplane, for transferring modem information through the backplane to the DS channels. Each modem card controls a predetermined number of modem units to transfer modem information between the modem units and the DS channels through the backplane, wherein the first and second modem group of streams are selectably assignable to transfer information, through the backplane, to the first and second trunk group of streams such that each modem unit is assigned a communication channel for transferring modem information thereby allowing full utilization of all of the modem units.

The foregoing and other objects, features and advantages of the present invention will be apparent from the following detailed description of the preferred embodiments, which make reference to the several figures of the drawing.

IN THE DRAWINGS

FIG. 4 shows a chart listing the different types of modem and trunk cards made available by Cisco Systems, Inc.

Figure 7:
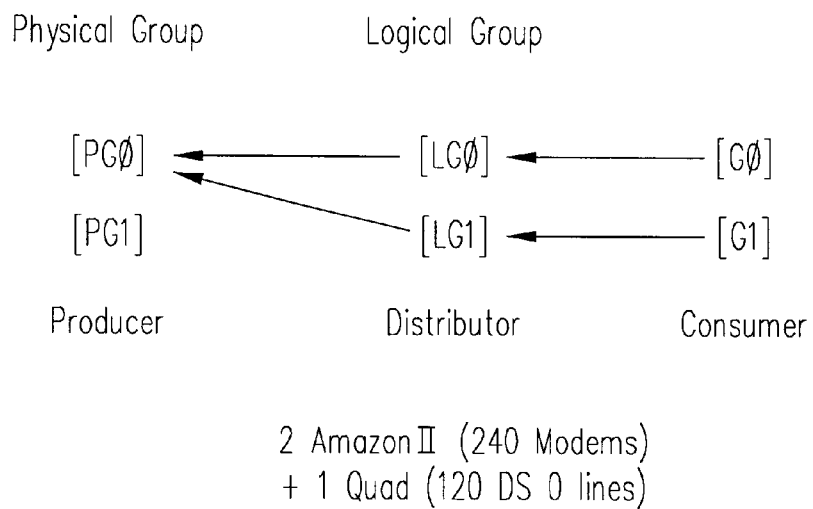

FIG. 7 presents an example of a logical to physical group mapping using a Quad trunk feature card.

DETAILED DESCRIPTION OF THE PREFERRED EMBODIMENTS

Definitions

Producer

A trunk feature card within a router system is referred to as a 'Producer'. Upon system initialization, the Producer determines the number of TDM backplane timeslots to be allocated to modem (or DSP) feature cards for communication of digital information between communications devices, such as modems, to Digital Subscribers (DS0). This allocation is maintained in the form of pointers, such as linked lists pointing to the location of resource pool(s), with the Distributor.

The resource pools are organized as groups of backplane timeslots. The group arrangement is based on the configuration of the backplane TDM streams. These streams are configured into two groups with each group having four streams. These groups are numbered Group 0 (G0) and Group 1 (G1) where two groups are employed and similarly numbered where more than two groups exist.

More recently-developed versions of trunk cards (such as Cisco Technology, Inc.'s Octal trunk card) have access to more than one set of timeslot resources group. That is, G1 backplane timeslot resources (as well as G0 resources) are available for use by the Octal type of trunk card thereby making available more TDM streams through the backplane to the card. A group is accessible to a card when the physical wiring for causing the appropriate connections is available on the card. Whereas, older versions of trunk cards (such as Cisco's Quad 1 and Dual trunk cards), only have access to one group of TDM streams, i.e. the G0 backplane TDM streams, and accordingly can not access G1 timeslot resources. Another type of trunk card, developed by Cisco Technology, Inc., the Quad II, while being of a more recently-developed type of card, also only has access to one set of TDM streams, namely, G0.

Consumer

The Consumer is defined as the modem feature card residing within the router system. The Consumer utilizes (or consumes) the backplane timeslots resource(s) allocated by the Producer.

Consumption takes place, for example, when a modem is either making an outgoing call or accepting an incoming call and requires an electrical coupling between the modem feature card and the DS0 on the trunk card.

The allocation of the backplane timeslot is dependent upon the type of modem feature board that is included in the router system.

Most of the older designs of modem feature boards only have access to the G0 backplane TDM streams whereas a more recently-developed modem feature board (such an example is an Amazon II family of products, which is designed and manufactured by Cisco Systems, Inc.) has access to G0 as well as G1 backplane TDM streams.

Consumers (or the modem feature cards) make requests for TDM backplane streams to the 'Distributor' asking for resources from a logical stream LG0 or LG1. The 'distributor' will map these requests to physical stream groups that the 'producer' has registered with the 'distributor'. Thus, the modem feature boards consume TDM stream resources based upon their logical group designations and the trunk cards produce TDM stream resources based upon their physical ability to drive the TDM bus. Old modem feature cards will always ask for resources from logical group 0 whereas new modem feature cards can ask for either logical group 0 or logical group 1 resources. That is, in the case of the new modem feature cards, the appropriate physical wiring exists for causing connections from each new modem card to two sets of TDM streams (PG0 and PG1) whereas the older modem feature cards do not include the requisite physical wiring to access more than one group of TDM streams.

Distributor

The Distributor maintains pointer references to the location of physical backplane timeslots for allocation thereof by the Producer and utilization thereof by the Consumer. These pointers are defined as Logical Group 0 (LG0) and Logical Group 1 (LG1). The distributor is a collection of data structures that abstractly provide pointers linking modems (or Consumers) to physical groups (of a Producer).

LG0 is used by the Producer to point to the location of the Physical Group 0 (PG0) backplane timeslots resource within the Producer. Similarly, LG1 is used to point to the location of the Physical Group 1 (PG1) within the Producer.

The Distributor causes the physical characteristics of the Producer to be transparent to the Consumer for reasons that will become apparent later in this document. Accordingly, the Consumer has knowledge solely of LG0 and LG1 pointer references.

This dynamic backplane timeslots resource management is based upon the relationships of the producer, the distributor and the consumer.

The backplane timeslots resource is very much dependent upon which trunk card is installed in the system. For all the trunk cards that can be supported by the AS5200 and AS5300 routers, the total number of backplane timeslots that can produce ranges from 60, 120, and up to 240.

The number of backplane timeslots that can be consumed by the DSPs on the modem feature card is also dependent upon which modem feature card is installed in the system. This number ranges from 48, 60, 96, 120, and up to 240.

In an AS5200 or AS5300 router, there is no restriction on how the feature cards can be installed in any of the three slots in the system.

Since it is not possible to know apriori what feature cards are in the system, as each of the feature cards is coming up in the system, it is mandatory to allow the Producer (the trunk card) and the Consumer (the modem feature card) to be totally unaware of each other's characteristics. The Distributor is therefore required to basically maintain a set of data structures that de-couples the relationship between the Consumer and the Producer.

The Consumer is then only concerned with whether it should choose LG0 or LG1 based upon its particular physical characteristics. Meanwhile, the Producer need not be aware of such Consumer physical characteristics thus allowing inter-operability of different modem feature boards with different trunk feature boards.

Figure 1:
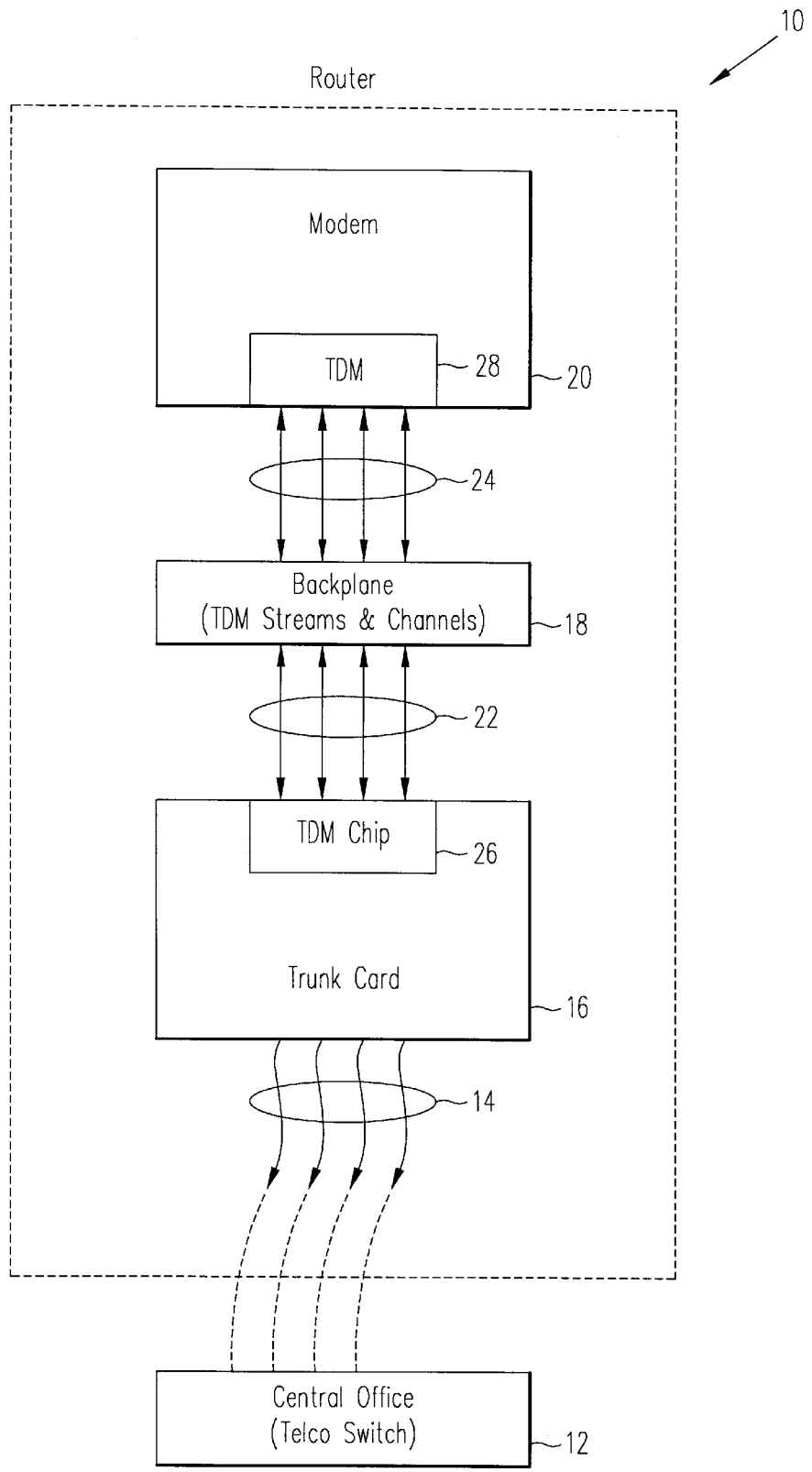
FIG. 1 shows a prior art router system.
Figure 2:
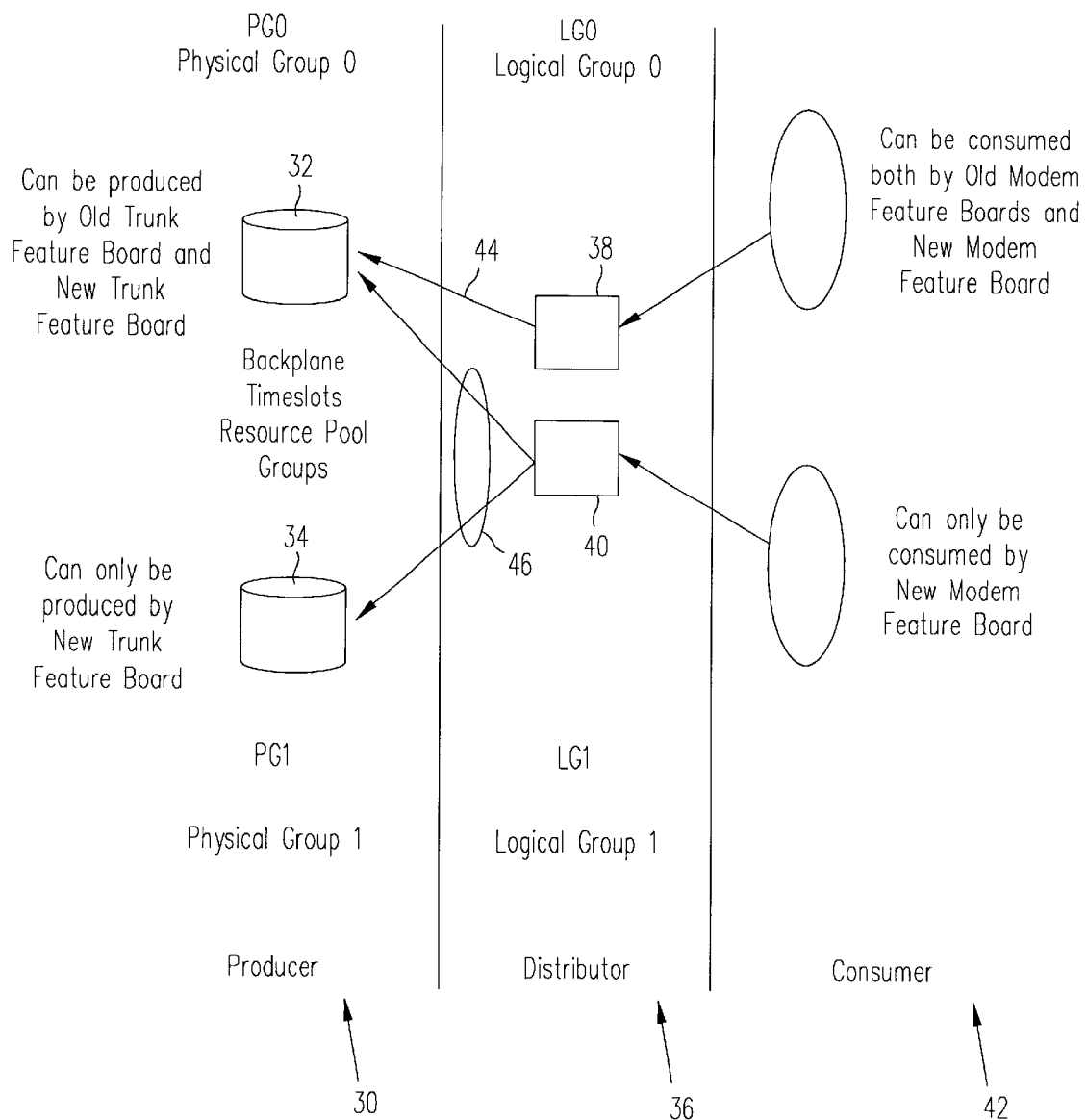
FIG. 2 illustrates a conceptual diagram of the relationship between a Producer, a Distributor and a Consumer, as defined by the present invention.

FIG. 2 shows, in conceptual form, the relationships between a Producer 30, a Distributor 36 and a Consumer 42. The Producer 30 is shown to include two backplane timeslots resource pool groups, a Physical Group 0 (PG0) 32 and a Physical Group (PG1) 34. The Distributor 36 is shown to include two logical groups used as pointers to point to the location of the backplane timeslot resource pool groups: a Logical Group 0 (LG0) 38; and a Logical Group 1 (LG1) 40. The Distributor thus maintains the logical-to-physical mapping of the TDM backplane streams for G0 and G1. The Consumer 42 is shown to indicate that the older version of modem feature boards as well as the newer versions of modem feature boards consume or utilize those backplane time slot resource pool groups to which LG0 38 points and that only the newer versions of modem feature boards consume or utilize the backplane time slot resource pool groups to which LG1 points.

The arrow at 44, in FIG. 2, show that LG0 38 points only to PG0, whereas, LG1 40, at 46, points to both PG0 32 and PG1 34. A new modem feature card will always request resources from LG1 40 if it is the first modem card to be identified in the router system during initialization. However, if there are more than one new modem feature cards in the router system, the second modem feature card to be identified during initialization, will request resources from LG0 38. This allows for full consumption or utilization of the available resources, as will become more apparent from the discussions presented hereinbelow.

Where older versions of a trunk feature card is employed in a router system, the old trunk feature card will register with the Distributor, to supply backplane time slot resources for both LG0 38 and LG1 40 from its PG0 32 resources. Conversely, where newer versions of a trunk feature card is employed in a router system, the newer trunk feature card will register with the Distributor to supply resources for LG0 38 from its PG0 resources and to supply resources for LG1 40 from its PG1 34 resources.

Figure 3:
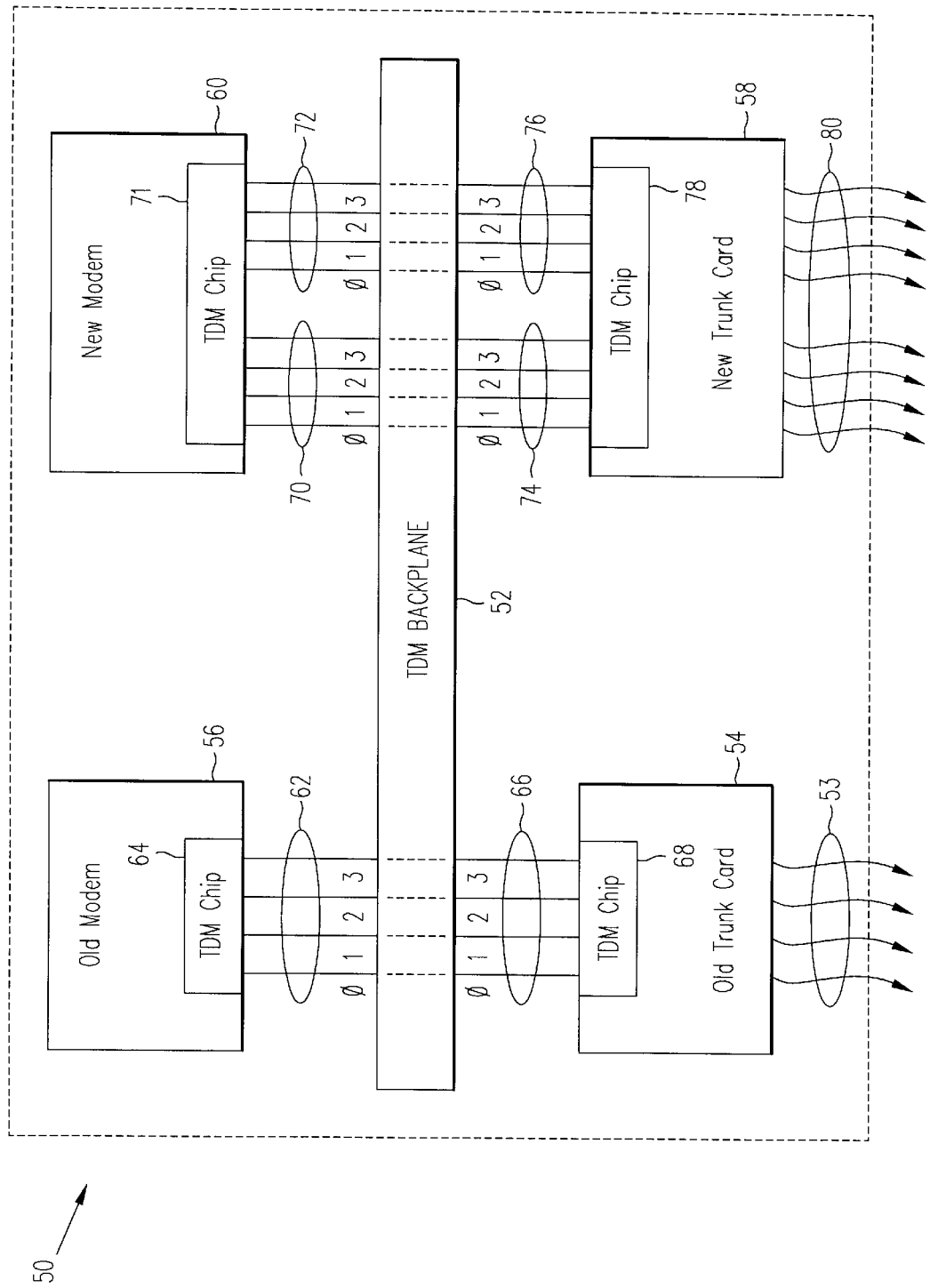
FIG. 3 shows a router system in accordance with a preferred embodiment of the present invention.

Referring now to FIG. 3, a router system 50 is shown to include a combination of older as well as newer types of trunk and modem feature cards. The router system 50 is shown to include a TDM backplane 52, an old-version trunk feature card 54, an old-version modem feature card 56, a new-version trunk card 58 and a new-version modem feature card 60.

The old trunk card 54 is coupled to the old modem card 56 through the TDM backplane 52. Similarly, the new trunk card 58 is coupled to the new modem card 60 through the TDM backplane 52. The old modem cards 56 and 60 each transfer modem (or DSP) information to and from a plurality of modem devices (not shown), which may be of different types. The new modem card 60 however, supports more modem devices than the old modem card 56.

The old modem card 56 is coupled to the TDM backplane 52 through a plurality of streams 62, defined as Group 0 (G0). The plurality of streams 62 includes four streams numbered 0–3. These streams are received by a TDM chip 64, within the old modem card 56.

The old trunk card 54 is coupled to the TDM backplane 52 through a plurality of streams 66, which are a total of 4 streams, numbered 0–3. The plurality of streams 66 carry information that is transmitted through the streams 62. A TDM chip 68 within the trunk card 54 generates the information coupled through the streams 66 and 62, onto the old modem card 56.

A plurality of trunk lines 53 are coupled to a central office (not shown) for communications of information between the central office and the old trunk card 54. The trunk lines 53, which are four lines altogether, may be either T1 or E1 type of communication lines. The streams 62 and 66 are static in that there are 4 pairs of physically hard-wired lines connecting the old modem card 64 to the TDM backplane 52 and similarly there are 4 pairs of physically hard-wired lines connecting the old trunk card 54 to the TDM backplane 52. Once connected, the coupling of the old trunk and modem cards is not dynamically alterable and G0 streams are the only communication option for transferring modem information from the modem feature card 64 to the trunk card 54. In the case, where each stream carries 30 modem channels, only up to 120 modem channels (G0 consists of 120 channels in total) can be coupled onto the trunk lines 53. Where more modem channels are being utilized, such as 160 or 180 modems, the system does not have access to the remaining number of modems, i.e. 40 or 60, respectively, because they do not have TDM backplane channels since all channels are being consumed by the 120 modems. Remaining modems thus remain idle and can not be utilized.

Conversely, newer modem and trunk card combinations do not have this problem due to the capability to dynamically allocate time slot resources (groups) of streams between the modem and trunk cards. In FIG. 3, further coupled to the TDM backplane 52 is a new-version modem feature card 60 through two sets of streams: a first plurality of streams 70 and a second plurality of streams 72, the first plurality being G0 and the second plurality being G1. Streams 70 and 72 carry modem (or DSP) information, between the backplane 52 and the new modem card 60. The new modem card 60 includes a TDM chip 71 for receiving modem information from the streams 70 and 72 that is in the form of TDM. Each of the stream line included within the streams 70 and 72, of which there are four within each stream or group (G0 and G1), carries 30 channels. Both streams together can therefore carry 8×30, or up to 240 modem channels before modems have to share channels.

Streams 70 and 72 are coupled to a plurality of streams 74 and 76, respectively. Streams 74 and 76 are, in turn, coupled to a new trunk card 58 for providing modem information through a plurality of trunk lines 80. The trunk lines 80 may be T1 or E1 type of communication channels, coupled to a central office (or telco switch, not shown).

The new trunk card 58 includes a TDM chip 78 for generating TDM information through the streams 74 (or G0) and 76 (or G1) to the new modem card 60. The new trunk card 58 may be of a type supporting 120 modems (such Cisco System, Inc.'s Quad and Quad II trunk card family of products) or 240 modems (such as Cisco System, Inc.'s Octal trunk card family of products).

Both of the trunk cards, 54 and 58, are Producers, identifying the number of DS0s that may be supported based on the type of card being utilized. The old trunk card 54 may be of the type to support 60 or 120 modems. This works well when the Consumer, or old modem card 56, is also of the type supporting 30, 24 or 60 modems. However, when there are more modems than the type of old trunk card 54 can support (by coupling the same to the number of DS0s being interfaced to the trunk card), and since each modem uses one channel at any given time, a number of the modems will not be utilized by the system, e.g. an under-utilization of the modems occurs. Since the old modem and trunk card streams are static, not much may be done by way of improving the system performance.

With respect to the new modem card 60 and the new trunk card 58 however, not only 8 streams (rather than the 4 streams used for the old modem/trunk combination) are used but the assignment of backplane time slots are dynamically alterable because G0 and G1 (70 and 72, and 74 and 76) are each assigned to a modem card in a way so as to maximize the utilization of the channels pursuant to a method employed by the present invention presented below.

Before such a discussion, however, the reader may find it helpful to learn of various types of modem and trunk card products, produced by Cisco Systems, Inc., which will serve as examples for better explaining the present invention. In FIG. 4 a chart 86 is presented to include such examples. A column 82 is included in chart 86 for presenting four different examples of trunk feature card products: Dual, Quad, Quad II and Octal. A row 84, included within the chart 86, lists four different types of modem feature cards: Parador, Microcom, Amazon I and Amazon II. These names, define some examples of the trunk and modem feature cards developed by Cisco Technology, Inc.

The Dual and Quad trunk cards of column 82 are considered older-version of trunk cards and may be considered as examples of the type of card the old trunk card 54 (in FIG. 3). Similarly, Quad II and Octal trunk cards listed in column 82 of chart 86 are newer-versions of trunk feature cards, which may be considered examples of the type of feature cards that the new trunk card (in FIG. 3) represents. The Dual and Quad trunk cards support 60 and 120 modems, respectively, and the Quad II and Octal trunk cards support 120 and 240, respectively.

The Parador, Microcom and Amazon I modem feature cards are older-versions of modem cards that may be thought of as examples of the old modem card 56 (in FIG. 3) and Amazon II is a newer-version of modem cards, serving as an example of the new modem card 60. Parador supports 30 modems, Microcom supports 24 modems, Amazon I supports 60 modems and Amazon II supports 120 modems. Any of the modem cards in row 84 may be operational with any of the trunk cards of column 82, except for those combinations, designated at 88, which are considered illegal combinations due to incompatibility issues associated with those products. Furthermore, any of the trunk cards designated at column 82 may be combined with more than just one modem card of row 84.

Figure 5:
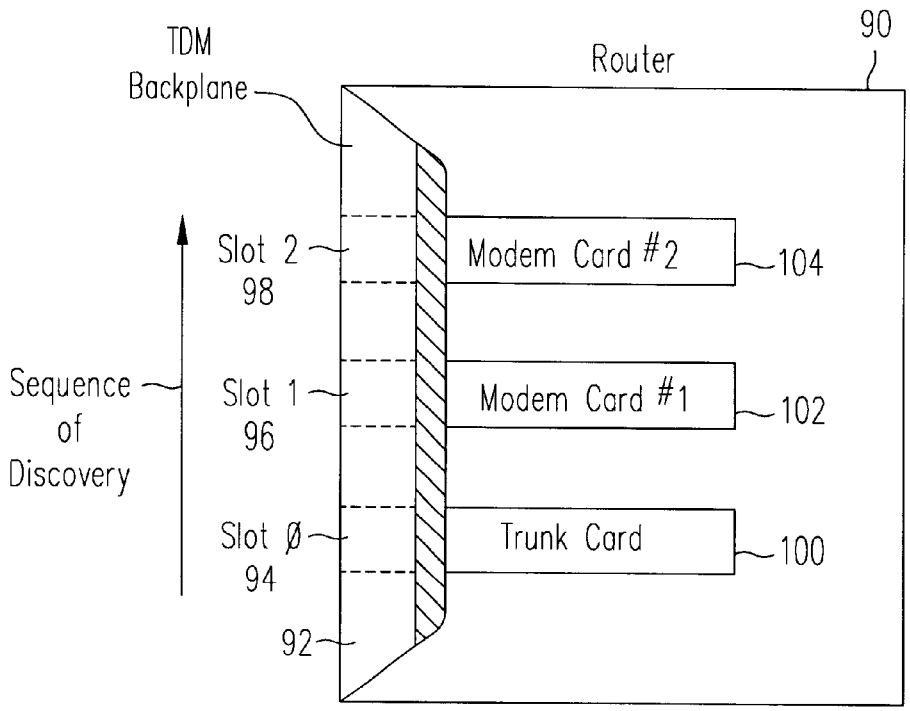
FIG. 5 shows, in conceptual form, an example of possible combinations of trunk and modem feature boards.

FIG. 5 illustrates, in conceptual form, an example of combining various feature cards, including a router system 90 including a TDM backplane having a slot 0 94, a slot 1 96 and a slot 2 98 for plugging therein various trunk and modem combinations of cards. This particular router system 90 is shown to include 3 slots, 94, 96 and 98 but more or less number of slots may be included within the system. A trunk feature card 100 is shown to be connected to slot 0 94 of backplane 92 for coupling thereof to other cards plugged into the backplane 92. A first modem feature card 102 is shown connected to slot 1 96 of the backplane 92 for coupling thereof to other cards, such as the trunk card 100. A second modem card 104 is shown connected to slot 2 98 for coupling thereof to the modem card 102 and the trunk card 100.

The TDM backplane 92 of FIG. 5 can be thought of as being similar to that of the TDM backplane 52 of FIG. 3. Similarly, the first and second modem cards, 102 and 104, respectively, may be the same or similar to the old and new modem cards, 56 and 60 of FIG. 3. Slots 1–2, 94–98, in FIG. 5, cause the coupling of the trunk cards to the modem cards, shown in FIG. 3, through the backplane.

FIG. 5 is shown to present a different view of a router system. Additionally, during initialization of the router system 90, there is a particular sequence of 'discovery' or identification of the cards that are included in the system. In the example shown in FIG. 5, slot 0 94 is the first to become operational and is accordingly identified as a particular type of trunk card. For instance, if the trunk card 100 was a Quad II type of card, this would be detected by the router system 90 and pursuant thereto, the system would realize that 120 modems may be supported since this is a characteristic of Quad II type of cards.

The next card to be identified is the one located in slot 1 96, which in the example of FIG. 5 would be a particular type of modem card, which forms the basis of the logical group-to-physical group mapping. For example, if the first modem card that is identified, i.e. the modem card 102, is detected to be an Amazon I type of modem, the router system 90 recognizes that 60 modem channels are to be consumed. Moreover, since Amazon I is an 'old' version of a modem feature card, it will be assigned to use the G0 streams. If the modem card 102 of FIG. 5 is the old modem card 56 (in FIG. 3), the only set of streams available is the G0 stream 62 since it is a static assignment and can not be dynamically allocated. However, if the modem card 102 of FIG. 5 was the new modem card 60 of FIG. 3, then the G0 stream 70 would be allocated to couple the new modem card 60 to the new trunk card 58. Where the new trunk card 58 is of a Quad II type (to use the same example), there would be more than a sufficient number of DS0 lines, i.e. 120, allocated with respect to the number of modem channels, i.e. 60, required. The importance of the type of trunk and modem cards will be perhaps better understood with respect to a flow chart presented later in this document.

Referring again to FIG. 5, the last card to be identified (or discovered) by the router system 90 is the modem card 104, which is allocated whichever backplane time slot group is appropriate.

Figure 6:
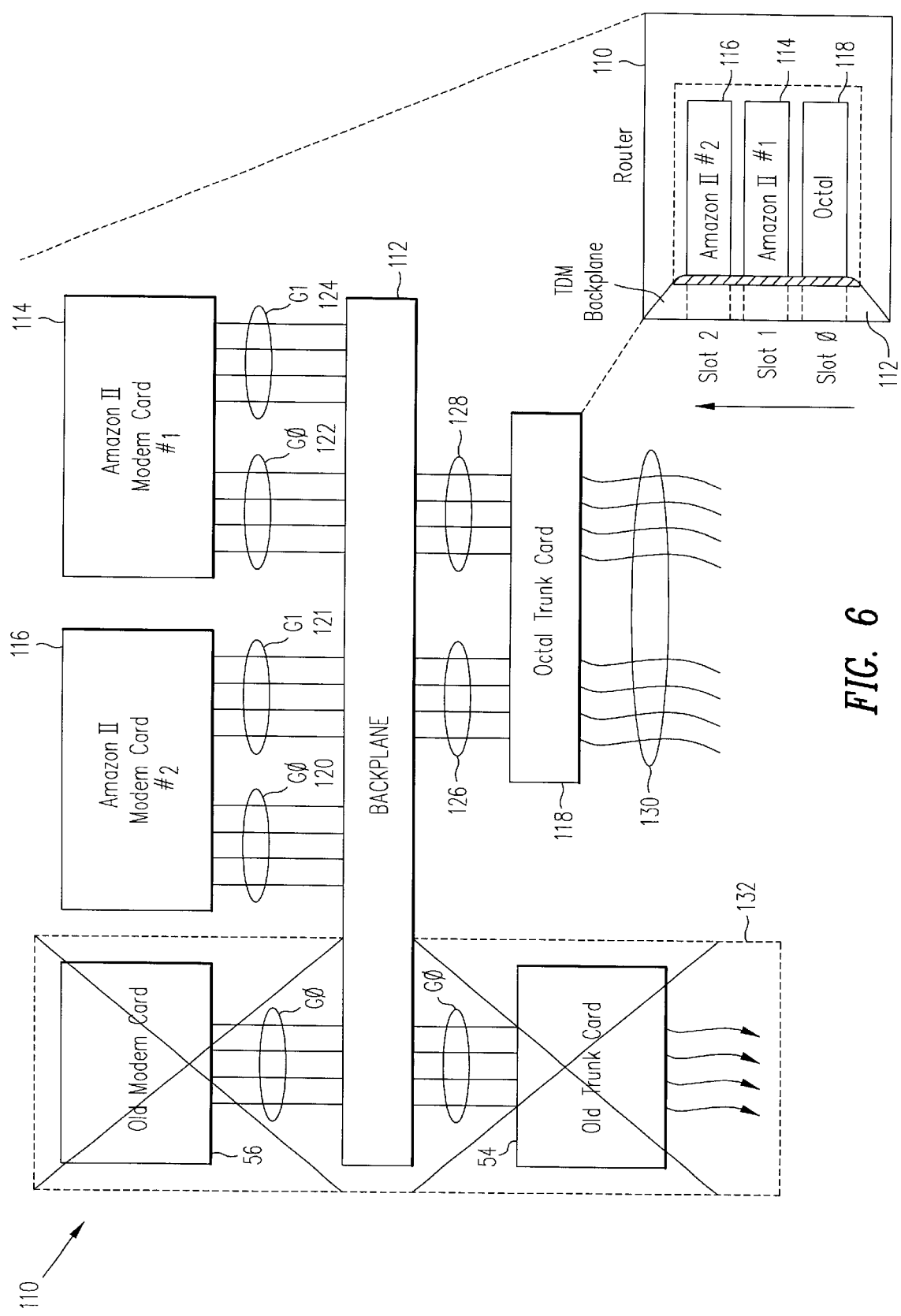
FIG. 6 shows an alternative embodiment of a router system in accordance with the present invention.

Referring now to FIG. 6, an example of a particular router system 110 is shown to include a TDM backplane 112 coupled to a first modem feature card 114 and a second modem feature card 116. The TDM backplane 112 is also coupled to a trunk feature card 118. G0 streams 120 and G1 streams 121 cause the coupling between the modem card 116 and the backplane 112 and G0 streams 122 and G1 streams 124 cause the coupling between the modem card 114 and the backplane 112. G0 streams 126 and G1 streams 128 serve to couple the trunk card 118 to the backplane 112. The streams 120, 121, 122, 124, 126 and 128 each include four stream lines, which can carry 30 channels of information.

In the example presented in FIG. 6, the modem card 114 is of the Amazon II type, as is the modem card 116. The trunk card 118 is of the Octal type, which is connected to DS1 lines 130.

Router 110 is also shown in a different view to include slots 0–2, which are connected through the backplane 112 to the trunk card 118, the modem card 114 and the modem card 116, respectively. Two different views of the router 110 in the same figure to help the reader understand the process that was explained hereinabove and will be further explained now.

Given that the trunk card 118 can support 240 DS0, the number of modem channels required by virtue of having two Amazon II type of modem cards (114 and 116) in the system are supported on a one-to-one basis without the need to share any DS0 lines. This is so because an Octal type of trunk feature card supports 240 DS0 and each Amazon II needs 120 modem channels.

When the router system 110 is initialized, again the sequence of identification of the cards will start from the first slot, or slot 0, which includes an Octal trunk card 118. Accordingly, the system realizes that both of the G0 and G1 streams are available. The next card that is identified by router system 110 is the modem card 114. Since this card is an Amazon II type of modem feature card and it is the first Amazon II type of card to be discovered by the system, it will be allocated the G1, streams 124. The next card to come up is the modem card 116 and it will be assigned to G0, streams 122 since this is the last group of stream that remains and since it is the second Amazon II card to be discovered in the system. Although, having two Amazon II modems implies that if anything other than an Octal trunk card was being employed (whereby 240 modems may be supported), system performance would have been affected since DS0 channels would have to be shared to support 240 modems if less than this many DS0 channels are being supported by a trunk card.

Furthermore, had the assignment of resources to the first Amazon II modem card 114 been other than G1 streams, i.e. G0 streams, and the second modem card to come up, i.e., modem card 116 was an older version of modem card, such as an Amazon I, then the latter would not have had access to the trunk card 118. That is, while there is access to G0 streams, not enough DS0 channels would be present to support the number of existing modems.

In another example, the presence of an Amazon I and an Amazon II type of modem feature cards coupled with a new trunk card including G0 and G1 stream connections, would cause the Amazon I and II cards to compete for G0 streams thereby creating resource contention and preventing the utilization of all modems. However, if the Amazon II card were to grab the G1 streams, this contention problem would be addressed since the Amazon I card can use the G0 streams.

The next figure presents logical-to-physical group mapping information for an example of trunk and modem card combinations. FIG. 7 presents an example of a mapping wherein a Quad type of trunk feature card (which supports up to 120 DS0s) is employed along with two Amazon II type of modem feature cards.

As previously noted, the logical group maintains the pointer to where the resource that is produced by the trunk (the reader is reminded that the trunk card is the Producer and the modem feature card is the Consumer) may be located. Stated differently, the logical group always points to a physical group, which is included in the TDM backplane. When a trunk card (or Producer) comes up in a router system, such as the systems explained in previous examples, there are two separate groups of physical resources allocated for the Distributor's use. The logical group points to the location of the physical group and there may be two distinct and independent pools of resources created. It is important to note that when the trunk card comes up and is identified, it has no knowledge of what, if any, other cards are present in the system and therefore, other cards' characteristics are unknown to the Producer. Similarly, when modem cards come up in the system and are identified individually, they too do not have any knowledge of what the Producer or other Consumers, if any, exist in the system. Thus, while Producers and Consumers co-exist in the system, each other's characteristics are not known to each other.

In FIG. 7, LG0 (logical group 0) will point to PG0 (physical group 0) and LG1 points to PG0 thereby leaving PG1 unused. This is because a Quad only provides access to group 0 and when the Quad trunk card comes up and its identity is known, the Distributor will be caused to point both LGs to PG0.

Although the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What I claim is:

1. A digital communications system for coupling a plurality of digital communication devices to a central office comprising:
   a backplane;
   a trunk card device coupled to Digital Subscriber (DS) channels and further coupled to a first trunk group of streams and a second trunk group of streams, said first and second trunk streams for transferring modem information to and from said DS channels through said backplane; and
   at least one modem card device having a predetermined number of modem units, said at least one modem card device coupled through a first modem group of streams and a second modem group of streams to said backplane for transferring modem information through said backplane to said DS channels, said at least one modem card device for controlling said predetermined number of modem units to transfer modem information between said modem units and said DS channels through said backplane,
   wherein said modem units are dynamically allocated to transfer information, through said backplane, to said first and second trunk group of streams so as to maximize utilization of all of the modem units.

2. A digital communications system as recited in claim 1 wherein each of said streams includes a predetermined number of channels of communication, each said predetermined number of channels for communicating modem information to a particular modem unit.

3. A digital communications system as recited in claim 1 wherein the digital system is a router system.

4. A digital communications system as recited in claim 1 wherein said DS channels are Time Division Multiplxed (TDM) channels of communication.

5. A digital communications system as recited in claim 1 wherein said DS channels include a first group of Digital Subscriber (DS0) channels and a second group of Digital Subscriber (DS1) channels for selectably and dynamically allocating said first and second modem groups of streams to the central office.

6. A digital communications system as recited in claim 1 including a second modem card device coupled to said backplane through a first modem group of streams and a second modem group of streams.

7. A digital communications system as recited in claim 6 wherein the type of trunk device and modem devices determines the selectable assignment and dynamic allocation of said first and second modem group of streams to said first and second trunk streams for communication of modem information therethrough.

8. A digital communications system as recited in claim 7 wherein the type of trunk and modem devices is determined upon initialization of the system.

9. A digital communications system as recited in claim 8 wherein upon the determination that the trunk device is of the type to support at least two groups of modem streams, a predetermined assignment is utilized for assigning the trunk group of streams to the modem group of streams based upon which type of modem card device is the first to be identified by the system.

10. A method for use in a digital communications system for selectively coupling a plurality of digital communication devices to a central office, the digital communication system including a backplane, a trunk card device coupled to Digital Subscriber (DS) channels and further coupled to a first trunk group of streams and a second trunk group of streams for transferring modem information to and from said DS channels through said backplane, at least one modem card device coupled through a first modem group of streams and a second modem group of streams to said backplane for transferring modem information through said backplane to said DS channels, each modem card for controlling a predetermined number of modem units to transfer modem information between said modem units and said DS channels through said backplane, the method comprising:

- providing a first modem card device and a second modem card device;
- upon initialization of the digital system, detecting the type of trunk card in the digital system;
- determining which type of modem device is the first modem card device;
- determining which type of modem device is the second modem card device; and
- based upon the type of trunk card detected and the determination of the type of device the first modem device is, selectively coupling the trunk card to the first and second modem cards so as to fully utilize all of the modem units accessible to the first and second modem cards.

11. A method for use in a digital communications system as recited in claim 10 wherein the step of determining which type of modem device the first modem device is, comprises a determination of the number of modem units that are to be accessed by the first modem device and the step of determining which type of modem device the second modem device is comprises a determination of the number of modem units that are to be accessed by the second modem device.

12. A method for use in a digital communications system as recited in claim 11 wherein the step of detecting the type of trunk card includes determining the number of DS channels coupled to the trunk card.

13. A digital communications system as recited in claim 10 wherein said DS channels include a first group of Digital Subscriber (DS0) channels and a second group of Digital Subscriber (DS1) channels for selectably coupling said first and second modem groups of streams to the central office.

* * * * *